(12) United States Patent
Yuan et al.

(10) Patent No.: US 11,370,193 B2
(45) Date of Patent: Jun. 28, 2022

(54) ORGANIC GLASS, AND PREPARATION METHOD AND USE THEREOF

(71) Applicant: Shaanxi University of Technology, Shaanxi (CN)

(72) Inventors: Xinqiang Yuan, Shaanxi (CN); Zhifeng Deng, Shaanxi (CN); Dan Wang, Shaanxi (CN); Wei Zhou, Shaanxi (CN); Taotao Ai, Shaanxi (CN)

(73) Assignee: Shaanxi University of Technology, Shaanxi (CN)

( * ) Notice: Subject to any disclaimer, the term of this patent is extended or adjusted under 35 U.S.C. 154(b) by 335 days.

(21) Appl. No.: 16/739,710

(22) Filed: Jan. 10, 2020

(65) Prior Publication Data
US 2021/0146654 A1 May 20, 2021

(30) Foreign Application Priority Data

Nov. 14, 2019 (CN) .......................... 201911111834.9

(51) Int. Cl.
| | |
|---|---|
| *B32B 5/20* | (2006.01) |
| *B29C 44/12* | (2006.01) |
| *B32B 5/16* | (2006.01) |
| *B32B 5/30* | (2006.01) |
| *B32B 17/10* | (2006.01) |
| *B32B 27/06* | (2006.01) |
| *B29K 33/00* | (2006.01) |
| *B29K 105/04* | (2006.01) |

(52) U.S. Cl.
CPC ................ *B32B 5/20* (2013.01); *B29C 44/12* (2013.01); *B32B 5/16* (2013.01); *B32B 5/30* (2013.01); *B32B 17/10* (2013.01); *B32B 27/065* (2013.01); *B29K 2033/12* (2013.01); *B29K 2105/04* (2013.01); *B29K 2995/0035* (2013.01); *B32B 2264/025* (2013.01); *B32B 2266/0242* (2013.01); *B32B 2307/4026* (2013.01); *B32B 2307/422* (2013.01)

(58) Field of Classification Search
CPC .... B32B 5/20; B32B 5/16; B32B 5/30; B32B 17/10; B32B 2264/025; B32B 2266/0242; B32B 2307/422; B32B 27/065; B32B 2307/4026
See application file for complete search history.

(56) References Cited

U.S. PATENT DOCUMENTS

| | | | | |
|---|---|---|---|---|
| 5,269,977 | A * | 12/1993 | Nakahashi | ........... G02B 6/0041 264/45.3 |
| 6,603,020 | B1 * | 8/2003 | Moretti | ................. C09B 57/004 524/92 |
| 2022/0089941 | A1 * | 3/2022 | Miyahara | ............... G01N 11/02 |

* cited by examiner

*Primary Examiner* — Hai Vo
(74) *Attorney, Agent, or Firm* — Renner, Otto, Boisselle & Sklar, LLP (57) ABSTRACT

An organic glass includes an acrylic plate, a methyl methacrylate layer, and a fluorescent bubble layer that are sequentially stacked; and the fluorescent bubble layer is prepared from fluorescent polymethyl methacrylate beads, a first methyl methacrylate prepolymer and a second methyl methacrylate prepolymer. The fluorescent polymethyl methacrylate beads added into the raw material of the organic glass have an expandable characteristic, and can generate bubbles according to a design pattern to achieve the purpose of controllable bubbles, and the added fluorescent polymethyl methacrylate beads show fluorescent green under ultraviolet irradiation, giving bubbles a fluorescent color, and enabling the organic glass to have extremely artistic and decorative effects.

8 Claims, 4 Drawing Sheets

ORGANIC GLASS, AND PREPARATION METHOD AND USE THEREOF

TECHNICAL FIELD

The present invention relates to the technical field of organic glass, and in particular to an organic glass, and a preparation method and use thereof.

BACKGROUND

Poly(methyl methacrylate) (PMMA, commonly known as the organic glass) is the one has the most excellent texture among synthetic transparent materials so far, and is widely applied in aviation, building materials, civil products and the like fields. In general, there should be no bubbles in an organic glass product. If there are bubbles in the organic glass product, it will affect the appearance of the organic glass product, and the most important thing is that it will affect the use performance of the organic glass product.

With the technological innovation and the increasing improvement of people's living standards, some bubble-containing organic glass products and research thereof have emerged at the right moment. Most typically, in order to solve the problem of PMMA crack extension under stress and improve the comprehensive performance of PMMA, researchers often use polymer microporous technologies such as a monomer polymerization method, a supercritical fluid precipitation method and a supersaturated gas method to prepare a PMMA micro-foaming product, and conduct researches in aspects of cell morphology and performances of cells, defects of the foamed product, etc. Furthermore, in order to meet the decorative and artistic effect requirements of a high-grade product such as embedded crafts, hotel lobby screens and KTV escalator columns, acrylic manufacturing enterprises often add a transparent foaming agent that is capable of decomposing to generate a gas in the range of 100-160° C. into a MMA (methyl methacrylate) prepolymer, or control process conditions, so as to produce a bubble-containing transparent organic glass product through an traditional production process of casting PMMA in batches.

Although the process is simple, the controllable degree of the contained bubbles is not high, which is prone to producing surface defects and thus affecting the aesthetics and use. Moreover, the contained bubbles have no color and thus cannot meet the specific requirements of decorative and artistic effects, thereby limiting their wide application.

SUMMARY

In view of this, the present invention provides an organic glass and a preparation method and use thereof. The organic glass provided by the present invention has a high degree of controllability of bubbles contained therein, has no defects on the surface, and has a color of the bubbles contained therein, thereby being capable of meeting the requirements of decorative and artistic effects.

In order to realize the aforementioned objective of the present invention, the present invention provides the following technical solution.

The present invention provides an organic glass, which includes an acrylic plate, a methyl methacrylate layer, and a fluorescent bubble layer that are sequentially stacked; and the fluorescent bubble layer is prepared from fluorescent polymethyl methacrylate beads, a first methyl methacrylate prepolymer and a second methyl methacrylate prepolymer.

Preferably, the fluorescent polymethyl methacrylate beads are prepared from the following raw materials in parts by mass: 100 parts of an acrylate monomer, 2-6 parts of an ethylene-vinyl acetate copolymer, 100-300 parts of water, 0.5-3 parts of polyvinyl alcohol, 0.5-3 parts of a diketopyrrolopyrrole fluorescent yellow dye solution, 0.1-0.5 parts of dibenzoyl peroxide and 0.1-0.5 parts of N,N-dihydroxyethyl p-toluidine.

Preferably, the diketopyrrolopyrrole fluorescent yellow dye solution is prepared from raw materials including the following components: a diketopyrrolopyrrole fluorescent yellow dye and xylene; and the mass ratio of the diketopyrrolopyrrole fluorescent yellow dye to xylene is 100:(0.02-0.1).

Preferably, the diketopyrrolopyrrole fluorescent yellow dye solution is prepared from the following raw materials in parts by mass:

100 parts of pigment red 254, 60-90 parts of 4-dimethylaminopyridine, 150-260 parts of di-tert-butyl dicarbonate and 800-1000 parts of tetrahydrofuran.

Preferably, the first methyl methacrylate prepolymer is prepared from raw materials including the following components: methyl methacrylate, benzoyl peroxide and N,N-dihydroxyethyl p-toluidine; and the mass ratio of methyl methacrylate, benzoyl peroxide and N,N-dihydroxyethyl p-toluidine is 100:(0.05-0.15):(0.1-0.3).

Preferably, the second methyl methylacrylate prepolymer is prepared from raw materials including the following components: methyl methacrylate and azobisisobutyronitrile; and the mass ratio of methyl methacrylate to azobisisobutyronitrile is 100:(0.05-0.1).

The present invention also provides a method for preparing the organic glass of the aforementioned technical solution, including the following steps:

adhering an acrylic plate to a surface of a toughened glass plate, then coating a first methyl methacrylate prepolymer onto a surface of the acrylic plate, and adhering a methyl methacrylate layer to the surface of the acrylic plate; and adhering fluorescent polymethyl methacrylate beads to a surface of the methyl methacrylate layer, then coating a first methyl methacrylate prepolymer onto a surface of the fluorescent polymethyl methacrylate beads, covering the toughened glass plate, pouring a second methyl methacrylate prepolymer, then sequentially conducting hardening, foaming and demolding, and adhering a fluorescent bubble layer to a surface of the methyl methacrylate layer to obtain the organic glass.

Preferably, the hardening has a temperature of 58-62° C. and a time of 3-5 h.

Preferably, the foaming has a temperature of 150-160° C. and a time of 1-2 h.

The present invention also provides the use of the organic glass of the aforementioned technical solution or the organic glass prepared by the preparation method of the aforementioned technical solution in the preparation of aquarium viewing glass, hotel lobby screens and KTV escalator columns.

The present invention provides an organic glass, which includes an acrylic plate, a methyl methacrylate layer, and a fluorescent bubble layer that are sequentially stacked; and the fluorescent bubble layer is prepared from fluorescent polymethyl methacrylate beads, a first methyl methacrylate prepolymer and a second methyl methacrylate prepolymer. In the present invention, the fluorescent polymethyl methacrylate beads added into the raw material of the organic glass have an expandable characteristic, and can generate bubbles according to a design pattern to achieve the purpose of controllable bubbles (all of the number, size and location of bubbles can be controlled), and the added fluorescent polymethyl methacrylate beads show fluorescent green under ultraviolet irradiation, giving bubbles a fluorescent color, and enabling the organic glass to have extremely artistic and decorative effects.

BRIEF DESCRIPTION OF THE DRAWINGS

The present invention will be described in further detail below with reference to the accompanying drawings and detailed description.

DETAILED DESCRIPTION

The present invention provides an organic glass, which includes an acrylic plate, a methyl methacrylate layer, and a fluorescent bubble layer that are sequentially stacked; and the fluorescent bubble layer is prepared from fluorescent polymethyl methacrylate beads, a first methyl methacrylate prepolymer and a second methyl methacrylate prepolymer.

In the present invention, unless otherwise specified, the raw materials as used are conventional commercial products in the art.

In the present invention, the fluorescent polymethyl methacrylate beads are preferably prepared from the following raw materials in parts by mass: 100 parts of an acrylate monomer, 2-6 parts of an ethylene-vinyl acetate copolymer, 100-300 parts of water, 0.5-3 parts of polyvinyl alcohol, 0.5-3 parts of a diketopyrrolopyrrole fluorescent yellow dye solution, 0.1-0.5 parts of dibenzoyl peroxide and 0.1-0.5 parts of N,N-dihydroxyethyl p-toluidine.

In the present invention, the fluorescent polymethyl methacrylate beads preferably includes 100 parts by mass of the acrylate monomer, and the acrylate monomer preferably includes one or more of methyl methacrylate, ethyl methacrylate, butyl methacrylate, methyl acrylate, ethyl acrylate and butyl acrylate. In the present invention, the purity of the acrylate monomer is preferably greater than 99%.

Based on the parts by mass of the acrylate monomer, the fluorescent polymethyl methacrylate beads preferably include 2-6 parts by mass, and further preferably 3-5 parts by mass of the ethylene-vinyl acetate copolymer.

Based on the parts by mass of the acrylate monomer, the fluorescent polymethyl methacrylate beads preferably include 100-300 parts by mass, and further preferably 150-250 parts by mass of water. In the present invention, the water is preferably deionized water.

Based on the parts by mass of the acrylate monomer, the fluorescent polymethyl methacrylate beads preferably include 0.5-3 parts by mass, and further preferably 1-2.5 parts by mass of polyvinyl alcohol. In the present invention, the number average molecular weight of the polyvinyl alcohol is preferably 1700-1800.

Based on the parts by mass of the acrylate monomer, the fluorescent polymethyl methacrylate beads preferably include 0.5-3 parts by mass, and further preferably 1-2.5 parts by mass of the diketopyrrolopyrrole fluorescent yellow dye solution. In the present invention, the diketopyrrolopyrrole fluorescent yellow dye solution is preferably prepared from the following raw materials including the following components: a diketopyrrolopyrrole fluorescent yellow dye and xylene; and the mass ratio of the diketopyrrolopyrrole fluorescent yellow dye to xylene is preferably 100:(0.02-0.1), and further preferably 100:(0.05-0.08).

In the present invention, the diketopyrrolopyrrole fluorescent yellow dye is preferably prepared from the following raw materials in parts by mass: 100 parts of pigment red 254, 60-90 parts of 4-dimethylaminopyridine, 150-260 parts of di-tert-butyl dicarbonate and 800-1000 parts of tetrahydrofuran, and further preferably 100 parts of pigment red 254, 70-80 parts of 4-dimethylaminopyridine, 180-240 parts of di-tert-butyl dicarbonate and 850-950 parts of tetrahydrofuran. In the present invention, the diketopyrrolopyrrole fluorescent yellow dye is preferably prepared by a method including the following steps: mixing pigment red 254, 4-dimethylaminopyridine, di-tert-butyl dicarbonate and tetrahydrofuran under a protective atmosphere to obtain the diketopyrrolopyrrole fluorescent yellow dye. In the present invention, the mixing mode is preferably magnetic stirring. The present invention has no specific limitation on the speed of the magnetic stirring, as long as the raw materials can be uniformly mixed. In the present invention, the time for the magnetic stirring is preferably one night. In the present invention, the protective atmosphere is preferably nitrogen. The diketopyrrolopyrrole fluorescent yellow dye adopted by the present invention can show fluorescent green under ultraviolet irrigation, giving organic glass bubbles with a fluorescent color, and enabling the organic glass to have extremely artistic and decorative effects.

Based on the parts by mass of the acrylate monomer, the fluorescent polymethyl methacrylate beads preferably include 0.1-0.5 parts by mass, and further preferably 0.2-0.4 parts by mass of dibenzoyl peroxide.

Based on the parts by mass of the acrylate monomer, the fluorescent polymethyl methacrylate beads preferably include 0.1-0.5 parts by mass, and further preferably 0.2-0.4 parts by mass of N,N-dihydroxyethyl p-toluidine.

In the present invention, the fluorescent polymethyl methacrylate beads are preferably prepared by a method including the following steps: mixing an acrylate monomer, an ethylene-vinyl acetate copolymer, water, polyvinyl alcohol and a diketopyrrolopyrrole fluorescent yellow dye solution, and then sequentially performing suspending and a low-temperature suspension polymerization reaction to obtain the fluorescent polymethyl methacrylate beads. In the present invention, the mixing sequence is preferably subjecting the diketopyrrolopyrrole fluorescent yellow dye solution, a part of the acrylate monomer, the ethylene-vinyl acetate copolymer and dibenzoyl peroxide to first mixing to obtain a first mixed solution, then subjecting N,N-dihydroxyethyl p-toluidine and the remaining acrylate monomer to a second mixing to obtain a second mixed solution, and then subjecting the polyvinyl alcohol and water to third mixing to obtain a third mixed solution. In the present invention, the mass ratio of the part of the acrylate monomer to the remaining acrylate monomer is preferably 9:1. The present invention has no specific limitation on the mixing manner, and a mixing manner well known to those skilled in the art can be adopted.

In the present invention, after the mixing is completed, the obtained first and third mixed solutions are suspended to obtain a suspended product. In the present invention, the suspending is preferably carried out under the condition of mechanical stirring. In the present invention, the mechanical stirring has a speed of preferably 200-240 r/min, and a time of preferably 20-30 min.

In the present invention, after the suspending is completed, preferably the suspended product is mixed with part of the second mixed solution to conduct a first polymerization reaction, and then mixed with the remaining second mixed solution to conduct a second polymerization reaction. In the present invention, the first polymerization reaction has a temperature of preferably 30-50° C., and a time of preferably 1-3 h. In the present invention, the second polymerization reaction has a temperature of preferably 40-60° C., and a time of preferably 2-4 h. In the present invention, the volume ratio of the part of the second mixed solution to the remaining second mixed liquid is preferably ½-⅔:⅓-½. In the present invention, after the second polymerization reaction is completed, preferably the product obtained from the second polymerization reaction is sequentially subjected to cooling, filtering, washing and drying, so as to obtain the fluorescent polymethyl methacrylate beads. The present invention has no specific limitation on the specific operations of the cooling, filtering, washing and drying, and the cooling, filtering, washing and drying manners well known to those skilled in the art can be adopted.

In the present invention, the first methyl methacrylate prepolymer is preferably prepared from raw materials including the following components: methyl methacrylate, benzoyl peroxide and N,N-dihydroxyethyl p-toluidine; and the mass ratio of methyl methacrylate, benzoyl peroxide and N,N-dihydroxyethyl p-toluidine is preferably 100:(0.05-0.15):(0.1-0.3), and further preferably 100:(0.06-0.12):(0.08-0.24).

In the present invention, the first methyl methacrylate prepolymer is preferably prepared by a method including the following steps: mixing methyl methacrylate and benzoyl peroxide under heating, then mixing with N,N-dihydroxyethyl p-toluidine at 0-10° C., and sequentially filtering and vacuum defoaming to obtain the first methyl methacrylate prepolymer. In the present invention, the heating is preferably conducted in a water bath, and the heating has a temperature of preferably 85-95° C. and a time of preferably 30-60 min. The present invention has no specific limitation on the mixing manner, and a mixing manner well known to those skilled in the art can be adopted. The present invention has no specific limitation on the specific operation manners of the filtering and vacuum defoaming, and filtering and vacuum defoaming manners well known to those skilled in the art can be adopted.

In the present invention, the second methyl methylacrylate prepolymer is preferably prepared from raw materials including the following components: methyl methacrylate and azobisisobutyronitrile; and the mass ratio of methyl methacrylate to azodiisobutyronitrile is preferably 100:(0.05-0.1), and further preferably 100:(0.06-0.08).

In the present invention, the second methyl methylacrylate prepolymer is preferably prepared by a method including the following steps: mixing methyl methacrylate and azodiisobutyronitrile under heating, and sequentially filtering and vacuum defoaming to obtain the second methyl methylacrylate prepolymer. In the present invention, the heating is preferably conducted in a water bath, and the heating has a temperature of preferably 75-85° C. and a time of preferably 30-60 min. The present invention has no specific limitation on the mixing manner, and a mixing manner well known to those skilled in the art can be adopted. The present invention has no specific limitation on the specific operation manners of the filtering and vacuum defoaming, and filtering and vacuum defoaming manners well known to those skilled in the art can be adopted.

The present invention also provides a method for preparing the organic glass of the aforementioned technical solution, including the following steps:

adhering an acrylic plate to a surface of a toughened glass plate, then coating a first methyl methacrylate prepolymer onto a surface of the acrylic plate, and adhering a methyl methacrylate layer to the surface of the acrylic plate; and adhering fluorescent polymethyl methacrylate beads to a surface of the methyl methacrylate layer, then coating a first methyl methacrylate prepolymer onto a surface of the fluorescent polymethyl methacrylate beads, covering the toughened glass plate, pouring a second methyl methacrylate prepolymer, then sequentially conducting hardening, foaming and demolding, and adhering a fluorescent bubble layer to a surface of the methyl methacrylate layer to obtain the organic glass.

In the present invention, the acrylic plate is adhered to the surface of the toughened glass plate, then the first methyl methacrylate prepolymer is coated onto the surface of the acrylic plate, and the methyl methacrylate layer is adhered to the surface of the acrylic plate. In the present invention, preferably the acrylic plate is adhered to the surface of the toughened glass plate through an adhesive strip. In the present invention, the thickness of the coating is preferably 50-150 μm, and further preferably 80-100 μm. In the present invention, the methyl methacrylate prepolymer preferably has the same ingredient as that of the first methyl methacrylate prepolymer, and thus will not be repeated here anymore. In the present invention, after the coating is completed, the coated acrylic plate is preferably allowed to stand for 10-30 min, until the swelling thickness of the methyl methacrylate prepolymer contacted with the acrylic plate is 5-15 μm and the surface of the methyl methacrylate prepolymer can be pulled out in a filiform shape.

In the present invention, after the methyl methacrylate layer is adhered to the surface of the acrylic plate, the fluorescent polymethyl methacrylate beads are adhered to the surface of the methyl methacrylate layer, then the first methyl methacrylate prepolymer is adhered onto the surface of the fluorescent polymethyl methacrylate beads, the toughened glass plate is covered, the second methyl methacrylate prepolymer is poured, then hardening, foaming and demolding are sequentially conducted, and the fluorescent bubble layer is adhered to the surface of the methyl methacrylate layer to obtain the organic glass. In the present invention, preferably the fluorescent polymethyl methacrylate beads are adhered to the surface of the methyl methacrylate layer according to the pattern design, so as to realize the purpose of controllable bubbles in the organic glass (all of the number, size and position of bubbles can be controlled). In the present invention, the thickness of the coating is preferably 20-50 μm, and further preferably 30-40 μm. In the present invention, after the coating is completed, the glass semi-finished product obtained after the coating is preferably allowed to stand for 60-120 min until the first methyl methacrylate prepolymer is cured to form a film. The present invention has no specific limitation on the pouring manner, and a pouring manner well known to those skilled in the art can be adopted. In the present invention, after pouring is completed, preferably the product obtained after pouring is sequentially subjected to compacting, venting and dimension deducting, and then subjected to hardening. The present invention has no specific limitation on the manners of the compacting, venting and dimension deducting, and manners of the compacting, venting and dimension deducting well known to those skilled in the art can be adopted.

In the present invention, the hardening is preferably conducted in a water bath, and the hardening has a temperature of preferably 58-62° C. and a time of preferably 3-5 h until the conversion rate of the second methyl methacrylate prepolymer is >90%. In the present invention, the foaming has a temperature of 150-160° C. and a time of 1-2 h. The present invention has no specific limitation on the foaming manner, and a foaming manner well known to those skilled in the art can be adopted. In the present invention, after the foaming is completed, preferably the product obtained by foaming is sequentially subjected to cooling, demolding and trimming to obtain the organic glass. The present invention has no specific limitation on the manners of the cooling, demolding and trimming, and the manners of the cooling, demolding and trimming well known to those skilled in the art can be used.

The present invention also provides the use of the organic glass of the aforementioned technical solution or the organic glass prepared by the preparation method of the aforementioned technical solution in the preparation of aquarium viewing glass, hotel lobby screens and KTV escalator columns.

The organic glass provided by the present invention, and the preparation method and use thereof will be described in detail below with reference to examples, but they cannot be understood as limiting the claimed scope of the present invention.

Example 1

1) Preparation of a diketopyrrolopyrrole fluorescent yellow dye solution: 100 parts of pigment red 254, 90 parts of 4-dimethylaminopyridine, 260 parts of di-tert-butyl dicarbonate and 1000 parts of tetrahydrofuran were weighed, and stirred overnight in nitrogen to obtain a diketopyrrolopyrrole fluorescent yellow dye; the prepared diketopyrrolopyrrole fluorescent yellow dye was mixed with xylene according to a mass ratio of 100:0.1 to obtain the diketopyrrolopyrrole fluorescent yellow dye solution.

2) Preparation of fluorescent polymethyl methacrylate beads: 100 parts of an acrylate monomer, 6 parts of an ethylene-vinyl acetate copolymer, 300 parts of water, 3 parts of polyvinyl alcohol, 3 parts of the diketopyrrolopyrrole fluorescent yellow dye solution, 0.5 parts of dibenzoyl peroxide, and 0.5 parts of N,N-dihydroxyethyl p-toluidine were weighed;

the diketopyrrolopyrrole fluorescent yellow dye solution was mixed with 90 parts of the acrylate monomer, the ethylene-vinyl acetate copolymer and dibenzoyl peroxide under the condition of 50° C. to obtain a first mixed solution;

N,N-dihydroxyethyl p-toluidine was mixed with 10 parts of the acrylate monomer to obtain a second mixed solution;

water was mixed with polyvinyl alcohol to obtain a third mixed solution;

the first mixed solution was mixed with the third mixed solution evenly at a rotating speed of 200-240 rotations/min to obtain a stable suspension system;

under a condition of 50° C., ⅔ of the second mixed solution was mixed with the obtained suspension system to react for 3 h, then the remaining ⅓ of the second mixed solution was added into the polymerization system to react continually for 4 h, and fluorescent polymethyl methacrylate beads were obtained after cooling, filtering, washing and drying.

3) Preparation of a first methyl methacrylate prepolymer: methyl methacrylate, benzoyl peroxide and N,N-dihydroxyethyl p-toluidine were weighed according to a mass ratio of 100:0.15:0.3; the methyl methacrylate and the benzoyl peroxide were polymerized in a water bath at 95° C. for 60 min, and then uniformly mixed with the N,N-dihydroxyethyl p-toluidine at 10° C., and subjected to filtering and vacuum defoaming to obtain the first methyl methacrylate prepolymer.

4) Preparation of a second methyl dimethacrylate prepolymer: methyl methacrylate and azodiisobutyronitrile were weighed according to a mass ratio of 100:0.1, the methyl methacrylate and the azodiisobutyronitrile were polymerized in a water bath at 85° C. for 60 min, and subjected to filtering and vacuum defoaming to obtain the second methyl dimethacrylate prepolymer.

5) Preparation of an organic glass: an adhesive strip was paved on the surface of the toughened glass plate, an acrylic plate was adhered to the surface of the toughened glass plate and fixed with a clamp, the surface of the acrylic plate was coated with the first methyl methacrylate prepolymer at a thickness of 150 μm and then allowed to stand for 30 min to obtain a methyl methacrylate layer.

According to a pattern design, fluorescent polymethyl methacrylate beads were sprayed on the surface of the methyl methacrylate layer, coated with the first methyl methacrylate prepolymer at a thickness of 50 μm on the surface of the fluorescent polymethyl methacrylate beads, covered by a toughened glass plate, fixed with a clamp, allowed to stand at room temperature for 120 min, then poured with the second methyl methacrylate prepolymer into a cavity, subjected to compacting, venting and dimension deducting, and hardened by polymerizing in a water bath at 62° C. for 5 h, and the obtained semi-finished product was foamed under a condition of 160° C. for 2 h and subjected to cooling, mold releasing and trimming to obtain the controllable-bubble organic glass with a fluorescent effect.

Figure 1:
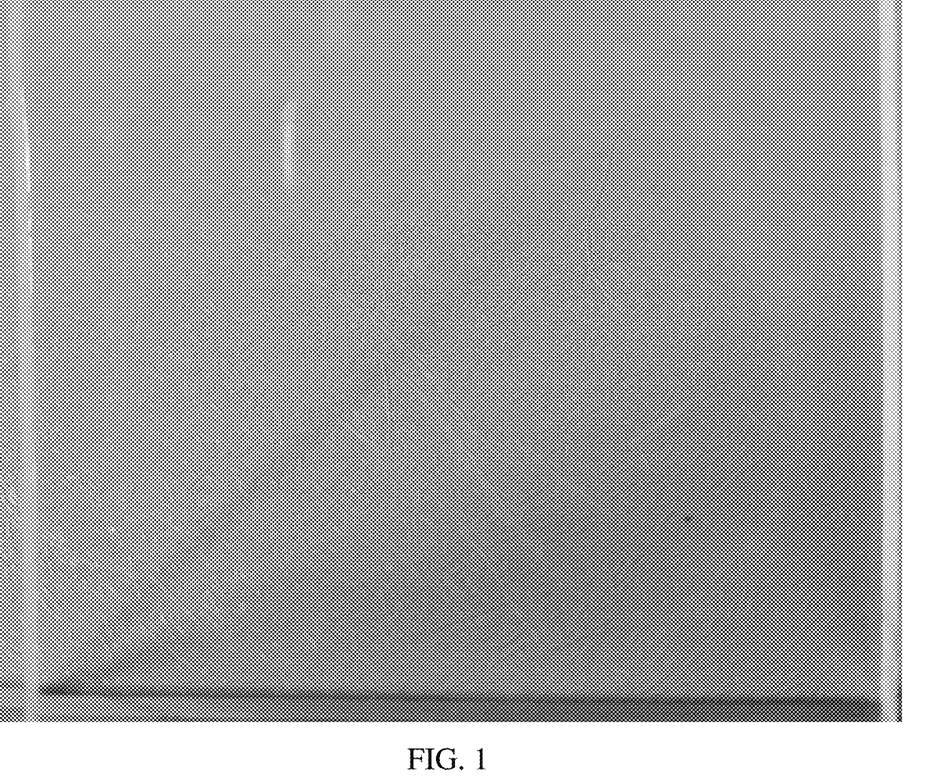
FIG. 1 is a real photo of an organic glass prepared in Example 1 under natural light in daytime.
Figure 2:
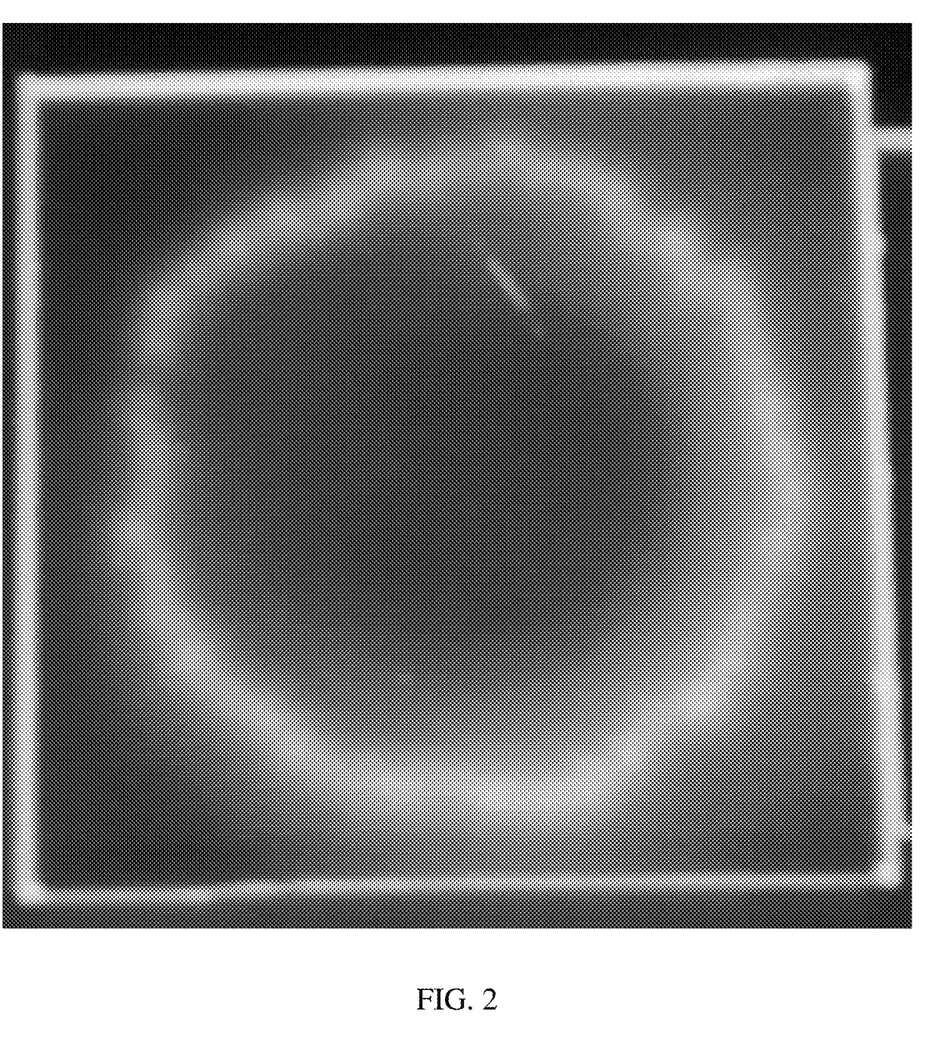
FIG. 2 is a real photo of the organic glass prepared in Example 1 under ultraviolet light in dark night.

FIG. 1 was a real photo of the organic glass prepared in Example 1 under natural light in daytime, and FIG. 2 was a real photo of the organic glass prepared in Example 1 under ultraviolet light in dark night. As can be seen from the figures, the number, size and position of bubbles in the organic glass were controllable, the surface of the organic glass was free of defects, and the organic glass showed fluorescent green under ultraviolet light.

Example 2

1) Preparation of a diketopyrrolopyrrole fluorescent yellow dye solution: 100 parts of pigment red 254, 60 parts of 4-dimethylaminopyridine, 150 parts of di-tert-butyl dicarbonate and 800 parts of tetrahydrofuran were weighed, and stirred overnight in nitrogen to obtain a diketopyrrolopyrrole fluorescent yellow dye;

the prepared diketopyrrolopyrrole fluorescent yellow dye was mixed with xylene according to a mass ratio of 100:0.02 to obtain the diketopyrrolopyrrole fluorescent yellow dye solution.

2) Preparation of fluorescent polymethyl methacrylate beads: 100 parts of an acrylate monomer, 2 parts of an ethylene-vinyl acetate copolymer, 100 parts of water, 0.5 parts of polyvinyl alcohol, 0.5 parts of the diketopyrrolopyrrole fluorescent yellow dye solution, 0.1 parts of dibenzoyl peroxide, and 0.1 parts of N,N-dihydroxyethyl p-toluidine were weighed;

the diketopyrrolopyrrole fluorescent yellow dye solution was mixed with 90 parts of the acrylate monomer, the ethylene-vinyl acetate copolymer and dibenzoyl peroxide under the condition of 50° C. to obtain a first mixed solution;

N,N-dihydroxyethyl p-toluidine was mixed with 10 parts of the acrylate monomer to obtain a second mixed solution;

water was mixed with polyvinyl alcohol to obtain a third mixed solution;

the first mixed solution was mixed with the third mixed solution evenly at a rotating speed of 200-240 rotations/min to obtain a stable suspension system;

under a condition of 50° C., ½ of the second mixed solution was mixed with the obtained suspension system to react for 3 h, then the remaining ½ of the second mixed solution was added into the polymerization system to react continually for 4 h, and fluorescent polymethyl methacrylate beads were obtained after cooling, filtering, washing and drying.

3) Preparation of a first methyl methacrylate prepolymer: methyl methacrylate, benzoyl peroxide and N,N-dihydroxyethyl p-toluidine were weighed according to a mass ratio of 100:0.05:0.1; the methyl methacrylate and the benzoyl peroxide were polymerized in a water bath at 85° C. for 30 min, and then uniformly mixed with the N,N-dihydroxyethyl p-toluidine at 0° C., and subjected to filtering and vacuum defoaming to obtain the first methyl methacrylate prepolymer.

4) Preparation of a second methyl dimethacrylate prepolymer:methyl methacrylate and azodiisobutyronitrile were weighed according to a mass ratio of 100:0.05, the methyl methacrylate and the azodiisobutyronitrile were polymerized in a water bath at 75° C. for 30 min, and subjected to filtering and vacuum defoaming to obtain the second methyl dimethacrylate prepolymer.

5) preparation of an organic glass: an adhesive strip was paved on the surface of the toughened glass plate, an acrylic plate was adhered to the surface of the toughened glass plate and fixed with a clamp, the surface of the acrylic plate was coated with the first methyl methacrylate prepolymer at a thickness of 50 μm and then allowed to stand for 10 min to obtain a methyl methacrylate layer;

According to a pattern design, fluorescent polymethyl methacrylate beads were sprayed on the surface of the methyl methacrylate layer, coated with the first methyl methacrylate prepolymer at a thickness of 20 μm on the surface of the fluorescent polymethyl methacrylate beads, covered by a toughened glass plate, fixed with a clamp, allowed to stand at room temperature for 60 min, then poured with the second methyl methacrylate prepolymer into a cavity, subjected to compacting, venting and dimension deducting, and hardened by polymerizing in a water bath at 58° C. for 3 h, and the obtained semi-finished product was foamed under a condition of 150° C. for 1 h and subjected to cooling, mold releasing and trimming to obtain the controllable-bubble organic glass with a fluorescent effect.

Figure 3:
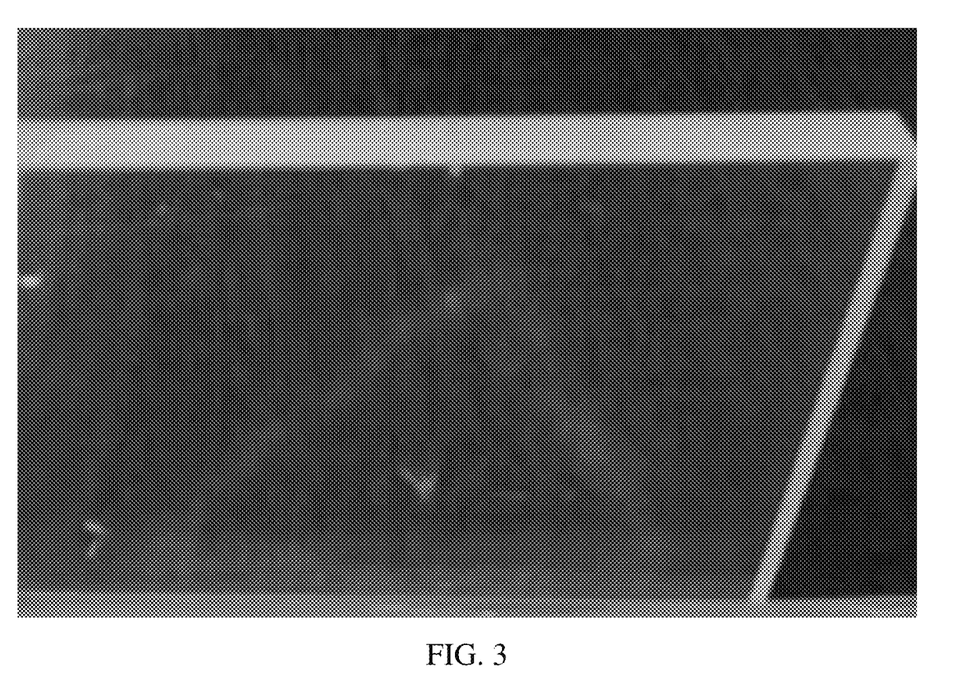
FIG. 3 is a real photo of an organic glass prepared in Example 2 under natural light in daytime.
Figure 4:
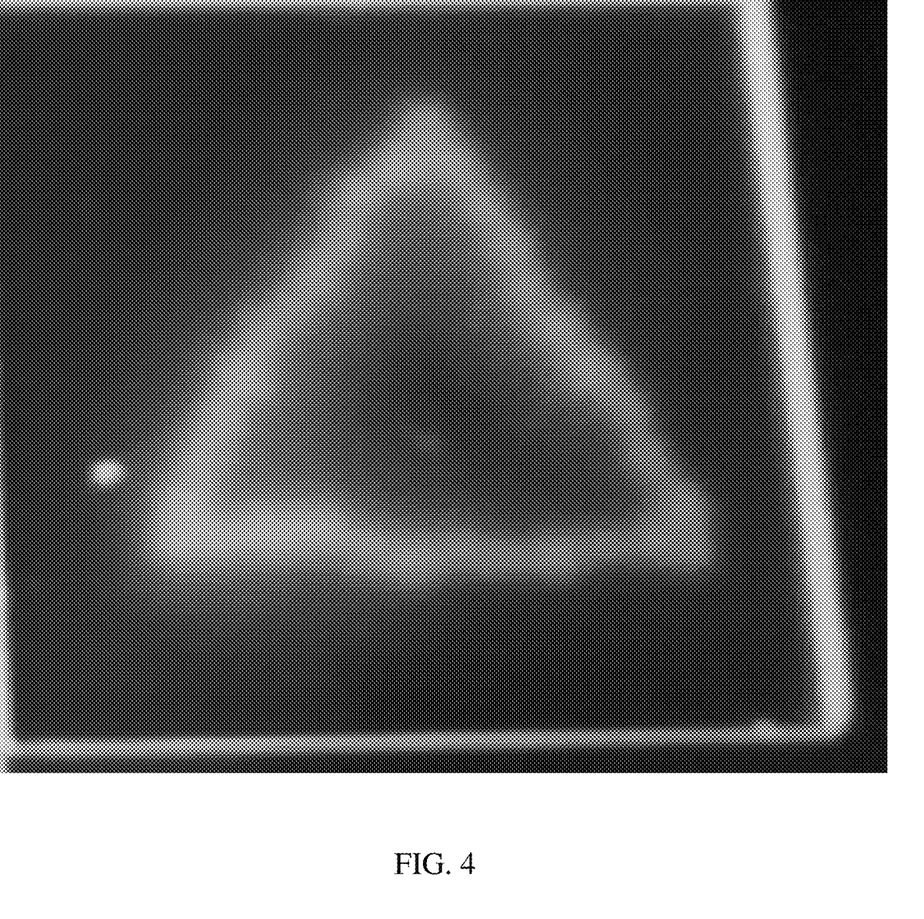
FIG. 4 is a real photo of the organic glass prepared in Example 2 under ultraviolet light in dark night.

FIG. 3 was a real photo of the organic glass prepared in Example 2 under natural light in daytime, and FIG. 4 was a real photo of the organic glass prepared in Example 2 under ultraviolet light in dark night. As can be seen from the figures, the number, size and position of bubbles in the organic glass were controllable, the surface of the organic glass was free of defects, and the organic glass showed fluorescent green under ultraviolet light.

Example 3

1) Preparation of a diketopyrrolopyrrole fluorescent yellow dye solution: 100 parts of pigment red 254, 75 parts of 4-dimethylaminopyridine, 200 parts of di-tert-butyl dicarbonate and 900 parts of tetrahydrofuran were weighed, and stirred overnight in nitrogen to obtain a diketopyrrolopyrrole fluorescent yellow dye;

the prepared diketopyrrolopyrrole fluorescent yellow dye was mixed with xylene according to a mass ratio of 100:0.5 to obtain the diketopyrrolopyrrole fluorescent yellow dye solution.

2) Preparation of fluorescent polymethyl methacrylate beads: 100 parts of an acrylate monomer, 4 parts of an ethylene-vinyl acetate copolymer, 200 parts of water, 2 parts of polyvinyl alcohol, 2 parts of the diketopyrrolopyrrole fluorescent yellow dye solution, 0.4 parts of dibenzoyl peroxide, and 0.4 parts of N,N-dihydroxyethyl p-toluidine were weighed;

the diketopyrrolopyrrole fluorescent yellow dye solution was mixed with 90 parts of the acrylate monomer, the ethylene-vinyl acetate copolymer and dibenzoyl peroxide under the condition of 50° C. to obtain a first mixed solution;

N,N-dihydroxyethyl p-toluidine was mixed with 10 parts of the acrylate monomer to obtain a second mixed solution;

water was mixed with polyvinyl alcohol to obtain a third mixed solution;

the first mixed solution was mixed with the third mixed solution evenly at a rotating speed of 200-240 rotations/min to obtain a stable suspension system;

under a condition of 50° C., ½ of the second mixed solution was mixed with the obtained suspension system to react for 3 h, then the remaining ½ of the second mixed solution was added into the polymerization system to react continually for 4 h, and fluorescent polymethyl methacrylate beads were obtained after cooling, filtering, washing and drying.

3) Preparation of a first methyl methacrylate prepolymer: methyl methacrylate, benzoyl peroxide and N,N-dihydroxyethyl p-toluidine were weighed according to a mass ratio of 100:0.1:0.2; the methyl methacrylate and the benzoyl peroxide were polymerized in a water bath at 90° C. for 40 min, and then uniformly mixed with the N,N-dihydroxyethyl p-toluidine at 5° C., and subjected to filtering and vacuum defoaming to obtain the first methyl methacrylate prepolymer.

4) Preparation of a second methyl dimethacrylate prepolymer:methyl methacrylate and azodiisobutyronitrile were weighed according to a mass ratio of 100:0.08, the methyl methacrylate and the azodiisobutyronitrile were polymerized in a water bath at 80° C. for 40 min, and subjected to filtering and vacuum defoaming to obtain the second methyl dimethacrylate prepolymer.

5) preparation of an organic glass: an adhesive strip was paved on the surface of the toughened glass plate, an acrylic plate was adhered to the surface of the toughened glass plate and fixed with a clamp, the surface of the acrylic plate was coated with the first methyl methacrylate prepolymer at a thickness of 100 μm and then allowed to stand for 20 min to obtain a methyl methacrylate layer;

According to a pattern design, fluorescent polymethyl methacrylate beads were sprayed on the surface of the methyl methacrylate layer, coated with the first methyl methacrylate prepolymer at a thickness of 35 μm on the surface of the fluorescent polymethyl methacrylate beads, covered by a toughened glass plate, fixed with a clamp, allowed to stand at room temperature for 90 min, then poured with the second methyl methacrylate prepolymer into a cavity, subjected to compacting, venting and dimension deducting, and hardened by polymerizing in a water bath at 60° C. for 4 h, and the obtained semi-finished product was foamed under a condition of 155° C. for 1 h and subjected to cooling, mold releasing and trimming to obtain the controllable-bubble organic glass with a fluorescent effect.

The real photo of the finished organic glass product prepared in this example is similar to those of Examples 1 and 2.

The above description is only preferred embodiments of the present invention. It should be pointed out that, for those of ordinary skills in the art, several improvements and modifications can be made without departing from the principle of the present invention. These improvements and modifications should also be considered as falling into the claimed scope of the present invention.

What is claimed is:

1. An organic glass, comprising an acrylic plate, a methyl methacrylate layer, and a fluorescent bubble layer that are sequentially stacked;
    wherein the fluorescent bubble layer is prepared from fluorescent polymethyl methacrylate beads, a first methyl methacrylate prepolymer and a second methyl methacrylate prepolymer, and
    wherein the fluorescent polymethyl methacrylate beads are prepared from the following raw materials: 100 parts by mass of an acrylate monomer, 2-6 parts by mass of an ethylene-vinyl acetate copolymer, 100-300 parts by mass of water, 0.5-3 parts by mass of polyvinyl alcohol, 0.5-3 parts by mass of a diketopyrrolopyrrole fluorescent yellow dye solution, 0.1-0.5 parts by mass of dibenzoyl peroxide and 0.1-0.5 parts by mass of N,N-dihydroxyethyl p-toluidine.

2. The organic glass according to claim 1, wherein the diketopyrrolopyrrole fluorescent yellow dye solution is prepared from raw materials comprising the following components: a diketopyrrolopyrrole fluorescent yellow dye and xylene; and the mass ratio of the diketopyrrolopyrrole fluorescent yellow dye to xylene is 100:(0.02-0.1).

3. The organic glass according to claim 2, wherein the diketopyrrolopyrrole fluorescent yellow dye is prepared from the following raw materials: 100 parts by mass of pigment red 254, 60-90 parts by mass of 4-dimethylaminopyridine, 150-260 parts by mass of di-tert-butyl dicarbonate and 800-1000 parts by mass of tetrahydrofuran.

4. The organic glass according to claim 1, wherein the first methyl methacrylate prepolymer is prepared from raw materials comprising the following components: methyl methacrylate, benzoyl peroxide and N,N-dihydroxyethyl p-toluidine; and the mass ratio of methyl methacrylate, benzoyl peroxide and N,N-dihydroxyethyl p-toluidine is 100:(0.05-0.15):(0.1-0.3).

5. The organic glass according to claim 1, wherein the second methyl methylacrylate prepolymer is prepared from raw materials comprising the following components: methyl methacrylate and azobisisobutyronitrile; and the mass ratio of methyl methacrylate to azobisisobutyronitrile is 100:(0.05-0.1).

6. A method for preparing the organic glass according to claim 1, comprising the following steps:
    adhering an acrylic plate to a surface of a toughened glass plate, then coating a first methyl methacrylate prepolymer onto a surface of the acrylic plate, and adhering a methyl methacrylate layer to the surface of the acrylic plate; and
    adhering fluorescent polymethyl methacrylate beads to a surface of the methyl methacrylate layer, then coating a first methyl methacrylate prepolymer onto a surface of the fluorescent polymethyl methacrylate beads, covering the toughened glass plate, pouring a second methyl methacrylate prepolymer, then sequentially conducting hardening, foaming and demolding, and adhering a fluorescent bubble layer to a surface of the methyl methacrylate layer to obtain the organic glass.

7. The preparation method according to claim 6, wherein the hardening has a temperature of 58-62° C. and a time of 3-5 h.

8. The preparation method according to claim 6, wherein the foaming has a temperature of 150-160° C. and a time of 1-2 h.

* * * * *